METHOD OF MAKING SUPERCONDUCTOR STOCK

Filed Jan. 25, 1967

INVENTOR
ANTHONY CLIFFORD BARBER
FRANCIS JOHN VERNON FARMER
BY Cushman, Darby & Cushman
ATTORNEYS 3,465,430

METHOD OF MAKING SUPERCONDUCTOR STOCK

Anthony Clifford Barber, Lichfield, and Francis John Vernon Farmer, Erdington, England, assignors to Imperial Metal Industries (Kynoch) Limited, Witton, Birmingham, England, a corporation of Great Britain Filed Jan. 25, 1967, Ser. No. 611,662
Claims priority, application Great Britain, Jan. 27, 1966, 3,757/66
Int. Cl. H01s *4/00*
U.S. Cl. 29—599 13 Claims

ABSTRACT OF THE DISCLOSURE

A superconducting wire or rod is made by interposing layers of a superconducting metal, such as an alloy of Nb-Ti, with layers of a non-superconducting metal, such as Cu, extruding the composite at elevated temperatures to produce a bond between the layers and drawing at ambient temperature to elongate the composite.

Disclosure

Background of the invention

This invention relates to superconductor materials and in particular to a method of manufacturing superconductors.

The phenomenon of superconductivity has been known for many years and several materials capable of good performance in high field environments are known, e.g. Nb-44 wt. percent Ti, Nb-67 wt. percent Ti, Nb-25 wt. percent Zr alloys, $Nb_3Sn$, $V_3Si$ and $V_3Ga$ compounds.

These materials, however, "degrade" when operated in a coil-form; the maximum characteristic (the ultimate current value) of a given superconductor is generally observed in short samples; when a superconducting filament is wound into a coil, the maximum properties are not obtained. This effect has been termed "degradation" and it results at least in part from local instabilities in flux (i.e. flux jumps) which produce local heating.

Description of prior art

It is known that simple surface plating of the superconductor with a normal material possessing good thermal and electrical conductivity, e.g. copper, improves the stability of the coil. The normal cnoductor material is thought to provide an alternative current path in the event of a local resistive region being formed and to provide a high thermal conductivity heat sink around the superconductor so as at least partially to stabilise the superconductor material by conducting away the heat produced by flux jumps, whereby the superconductor material is maintained below its critical temperature.

There are advantages to be gained from the use of fine filaments of superconducting material in these applications of which one is the degree of cold work that has been carried out on the superconductor material.

However, although superconducting materials include several metals and alloys which have sufficiently good ductility to permit their manufacture in wrought forms such as wires, rods, sheet and tube, production of these materials in the fine filamentary forms required, and provided with a good conductor for improved stability, raises considerable difficulties. Hence it is an object of the invention to reduce these difficulties to a substantial degree.

Summary of the invention

According to the present invention, a method of making a composite electrical conductor comprises mechanically working together a plurality of elements of a ductile superconductor material with a ductile normal material of high electrical and thermal conductivities to enclose a plurality of ribbons, filaments or layers of superconductor material in and bonded to a matrix of the normal material.

Preferably, the mechanical working together of the superconductor elements and the ductile normal material is at least initially carried out at an elevated temperature which is high enough to produce the bond between the superconductor and normal materials, but below that at which a low melting point eutectic is formed between the superconductor and normal materials.

Preferably the method additionally comprises mechanically working together the superconductor elements and the ductile normal material at approximately ambient temperatures.

The superconducting material is thereby reduced to a sufficiently small cross-section and contains the desired cold working, whilst being supported by the normal material; in practice, very thin filaments of superconducting material which are completely surrounded by the normal conductor and are in good thermal and elecrtical contact therewith can be obtained.

The high and ambient temperatures mechanical working may be carried out by extrusion, rolling, rod rolling, forging, swaging and drawing. Thus, extrusion may be carried out at high temperatures, followed by ambient temperature extrusion or drawing, or drawing may be used for both of these stages of working.

The composite may be constructed from one or more superconducting metals or alloys and one or more normal materials. A suitable superconducting metal is niobium, whilst examples of suitable superconducting alloys are niobium alloyed with one or more of the metals zirconium, titanium, hafnium and tantalum, such as niobium-44% titanium (by weight) and niobium-67% titanium. Also niobium-titanium alloys containing 0–3000 parts per million of interstitial elements such as carbon and/or oxygen and/or nitrogen and/or hydrogen may be used; it may be possible to carry out the invention with up to 5000 p.p.m. of interstitial elements. The normal materials available include copper (preferred), (aluminium, silver, indium and cadmium may also be applicable), and preferably have a very high electrical conductivity at cryogenic temperatures, e.g. 4.2° K. In addition, it is preferable that the working characteristics of the chosen superconductor and normal materials be similar.

The interstitial elements are present in solution in the alloy or as a dispersed phase, e.g. titanium nitride precipitates, present in the alloy in the form of fine particles suitable for flux pinning. The precipitate itself may cause pinning or, alternatively, it may assist dislocation network or tangle formation which may behave as pinning centres. A heat treatment before processing and/or during processing and/or after processing may be necessary for the formation of the most favourable internal structure for optimum superconducting properties in the composite. For example, the niobium-67% titanium alloy may be given a solution treatment above 700° C., and then quenched. The composite superconductor may be heat treated in the range 100–700° C., preferably 200–600° C., preferably further 250–450° C. in order to precipitate a fine particulate phase or phases in a form which may assist dislocation network formation (by the interaction between the dislocations formed during cold working and the fine particles precipitated during ageing); or which may themselves assist flux pinning. The structure may be further refined by additional cold work. If the niobium-44 wt. percent titanium is used, during or after the cold working, for optimum properties the composite conductor is subjected to a heat treatment at 200–500° C., preferably 300–450° C. to refine the dislocation tangles formed by working and/or to produce precipitation of the interstitial compounds.

The assemblies from which the composites are made may be constructed from superconducting material and normal material in a variety of forms, for example, foil, sheet, rod and tube, or preformed shapes such as castings. The normal metal may also be melted and cast around cores of superconducting material.

Brief description of the drawings

Typical ways of carrying out the method of the invention will now be more particularly described with reference to the accompanying drawings in which.

In all of the figures the superconductor material is shown shaded for ease of identification.

Description of the preferred embodiments

Figure 1:
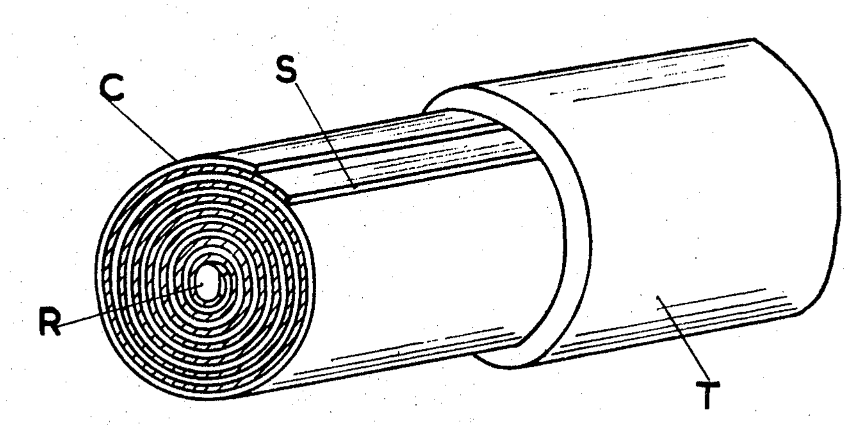
FIGURE 1 is a perspective view of an assembly of superconductor and normal materials.

Referring initially to FIGURE 1, Nb-44 wt. percent Ti superconducting alloy and high purity copper strips S and C respectively, each 3 inches wide, 0.003 inch thick and 9 inches long, were placed face to face and coiled tightly together around a high purity copper rod R. The tightly wound coil was then inserted into a tubular high purity copper container T of internal dimensions just larger than the coil, as shown in FIGURE 1. The ends of the container were capped and welded and the container evacuated through a small orifice left for the purpose and, finally, sealed to reduce the chances of contamination occurring; capping, evacuation and sealing are not essential, however, provided that the faces to be bonded are not excessively contaminated.

The assembly thus formed was extruded at 350–550° C., preferably 450° C., which temperatures are below that at which low melting point eutectics are formed between the alloy and copper, but sufficiently high for bonding to occur comparatively readily. A 6:1 extrusion ratio was used to give a section 0.5 inch diameter which, after cleaning, was drawn at ambient temperatures to 0.010 inch diameter through a series of dies.

Figure 2:
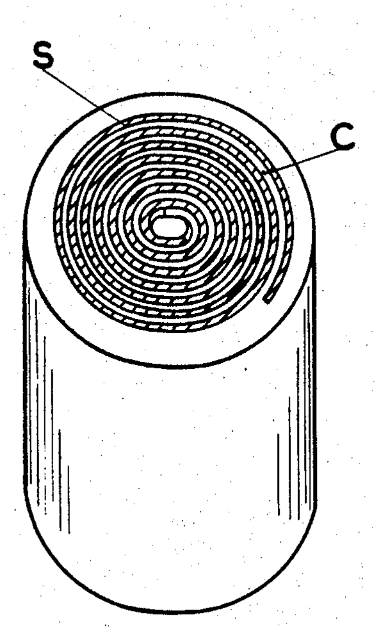
FIGURE 2 is an enlarged perspective view of a section of the product manufactured from the assembly shown in FIGURE 1.

It can be seen in FIGURE 2 that the helical formation of the original assembly was retained in the 0.010 inch diameter wire, so as to present a plurality of layers for current path. In addition, the ratio of normal to superconducting material is not greatly altered from that of the original assembly, in this instance 5:1. This ratio is predetermined in accordance with requirements.

Electrical tests subsequently showed that the superconducting part of the wire was capable of carrying a current density of at least $4\times10^4$ amp./cm.$^2$ at 40 kilogauss, and this was improved by 1 hour heat treatment of 0.040 in. wire at 400° C., followed by further ambient temperature drawing to 0.003 inch diameter wire. Further heat treatments can be applied between stages of cold working, the temperatures preferably being about 400° C., but possibly 450° C. or even 500° C. However, for optimum results the final heat treatment must not exceed about 400° C. and preferably none of the heat treatments should exceed that temperature. However, for very fine superconducting filaments, a final heat treatment may not be beneficial.

If a reduced extrusion ratio is used, extrusion can be carried out at room temperatures with an adequate bond formed between the copper and superconductor and, to a less satisfactory degree, between the outer layer of copper and the copper container T. For copper-to-copper bonding, the elevated temperatures are much preferred, although it is not essential that there shall be copper-to-copper bonding.

Figure 3:
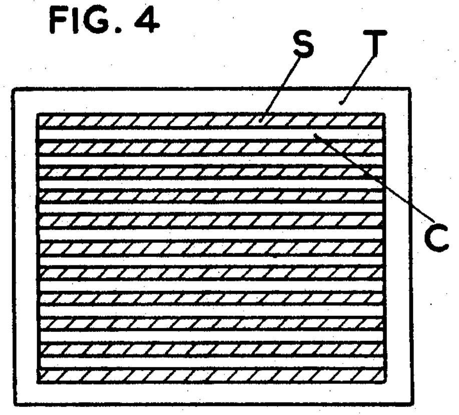
FIGURE 3 is an end elevation of another assembly of superconductor and normal materials.

Referring now to FIGURE 3, alternate sheets of Nb-44% Ti alloy and high purity copper, S and C respectively, are stacked face to face in a rectangular copper container T of internal dimensions just larger than the stack. The container is closed by welding on the lid, and is evacuated and sealed.

At ambient temperatures, or after heating to a temperature below that at which low melting point eutectics are formed, as previously described, the container T and its contents are forged and rolled to strip, final working being carried out at ambient temperatures, the superconducting material then being in the form of thin ribbons separated by copper, in a ratio dependent upon the relative thickness of the original sheets.

In an extension of this method, the finished strip is cut into lengths and stacked in a copper container which is closed and the treatment described above repeated. This produces a larger number of even thinner ribbons of superconducting material.

Figure 4:
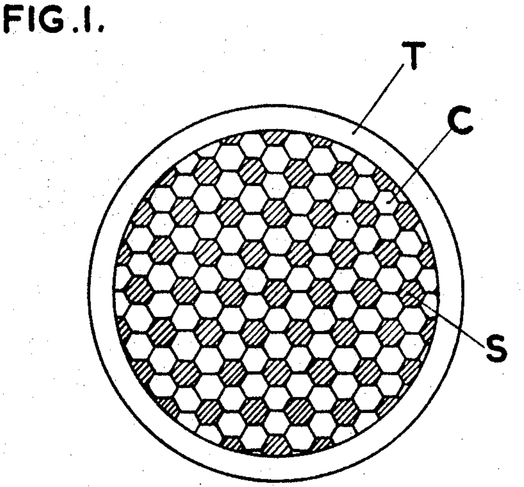
FIGURE 4 is an end elevation of yet another assembly of superconductor and normal materials.

FIGURE 4 shows an assembly of hexagonal rods of Nb-44% Ti alloy and high purity copper, S and C respectively, placed in a copper container in an arrangement whereby each Nb-44% Ti alloy rod is completely surrounded by copper. The most suitable shape for the rods where the cylindrical tubular container T of FIGURE 4 is used is hexagonal since the rods can be made into a tightly packed bundle without interior voids; voids around the bundle can be filled with strips of copper or copper wire. The container T is then capped, evacuated (this is not essential), sealed and extruded as in the methods described above to form wire containing fine filaments of superconducting material. The composite is then cold processed to finish dimensions and may be heat treated as described before.

A variation of the method described above in connection with FIGURE 4 involves first forming an elongated ductile superconductor element sheathed in ductile normal material, cutting the elongated sheathed element into lengths, arranging the lengths in side-by-side relationship in a container of ductile normal material and subsequently carrying out the previously-described elevated temperature working and the previously-described ambient temperature working. The initial elongated sheathed element is formed by providing an element of ductile superconductor material with a sheath of normal material, mechanically working the sheathed element at elevated temperature which is high enough to effect a bond between the superconductor and the sheath but which is below the temperature at which a low melting point eutectic is formed between the superconductor and the sheath and subsequently working the sheathed element at approximately ambient temperatures to cold work and elongate the element in and bonded with the sheath. In a preferred embodiment of this modification the elevated temperature working of the element and sheath is carried out by extruding at 350–550°, and the subsequent elevated working of the assembly of cut lengths and container is carried out by extruding at 200–450° C.

Extrusion is the form of mechanical working which has been described above for the primary stage of fabrication in which bonding of superconductor and matrix is effected, with drawing as the treatment for the secondary fabrication stage. This combination of processes maintains the ratio of superconductor to matrix more constant than is the case with rolling and the resulting product is of uniform section. However, extrusion alone or drawing alone may be used.

Where, in methods described above, sheet or strip superconducting material is used in a composite, the sheet or strip may be provided with slits in the longitudinal direction of the subsequent composite with the object of producing a greater number of filaments.

As an alternative, instead of assembling the components of the composite conductor all in the solid state, the cores of superconductor material can be located in a mould and the copper matrix cast around them. The composite is then extruded "canned" or "uncanned" as in previous methods. In this method, there is considerable latitude in the variety of shapes and arrangements of shapes of the cores of superconducting material.

Furthermore, the matrix can be preformed as a block of copper containing apertures into which the superconducting material is inserted. Such a block may be a casting or a piece of wrought metal in which the apertures are machined. After inserting the superconducting cores, the method follows that for the cast matrix composite above.

We claim:

1. A method of manufacturing a composite electrical conductor comprising: arranging a plurality of layers of ductile superconductor material with a plurality of layers of ductile normal material within a container of normal mterial to form an assembly in which at least some of the layers of the normal material are interposed between the layers of superconductor material and in which the container of normal material forms a sheath about the interposed layers, said superconductor material comprising an alloy selected from the group consisting of niobium-67 weight percent titanium and niobium-44 weight percent titanium; mechanically working said assembly at an elevated temperature which is high enough to produce a bond between the superconductor material and the normal material, but which is below the temperature at which a low melting point eutectic is formed between the super conductor material and the normal material; subsequently working said assembly at approximately ambient temperature to cold work and elongate the layers of superconductor material in and bonded with the sheath of normal material thereby forming a composite electrical conductor; and heat treating said alloy at some point in said method by solution treating above 700° C. and then quenching.

2. A method as in claim 1 wherein the composite electrical conductor is heat-treated at 100 to 700° C. to precipitate at least one fine dispersed phase.

3. A method as in claim 2 wherein the heat treatment is carried out at 250 to 450° C.

4. A method of manufacturing a composite electrical conductor comprising: arranging a plurality of layers of ductile superconductor material with a plurality of layers of ductile normal material within a container of normal material to form an assembly in which at least some of the layers of the normal material are interposed between the layers of superconductor material and in which the container of normal material forms a sheath about the interposed layers, said superconductor material comprising an alloy selected from the group consisting of niobium-67 weight percent titanium and niobium-44 weight percent titanium; mechanically working said assembly and sheath at an elevated temperature which is high enough to produce a bond between the superconductor material and the normal material, but which is below the temperature at which a low melting point eutectic is formed between the superconductor material and the normal material; subsequently working said assembly and sheath at approximately ambient temperature to cold work and elongate the layers of superconductor material in and bonded with the sheath of normal material; and heat treating the resulting composite electrical conductor at 200 to 500° C. after commencement of working at ambient temperature.

5. A method as in claim 4 wherein the heat treatment is at 300 to 450° C.

6. A method as in claim 1 wherein the step of forming said assembly includes coiling together at least one strip each of superconductor material and normal material and locating the resulting coil in a container of normal material, and wherein the step of working to produce a bond is carried out between 350° C. and 550° C.

7. A method as in claim 1 wherein the step of forming said assembly includes stacking alternate sheets of superconducting material and normal material face-to-face in a container of normal material, and wherein the step of working to produce a bond is carried out between 350° C. and 550° C.

8. A method as in claim 1 wherein the step of forming said assembly includes arranging a plurality of rods of superconductor material and normal material in a container of normal material to form an assembly in which substantially none of the rods of superconductor material contacts one another, and wherein the step of working to produce a bond is carried out between 350° C. and 550° C.

9. A method as in claim 4 wherein the step of forming said assembly includes coiling together at least one strip each of superconductor material and normal material and locating the resulting coil in a container of normal material, and wherein the step of working to produce a bond is carried out between 350° C. and 550° C.

10. A method as in claim 4 wherein the step of forming said assembly includes stacking alternate sheets of superconducting material and normal material face-to-face in a container of normal material, and wherein the step of working to produce a bond is carried out between 350° C. and 550° C.

11. A method as in claim 4 wherein the step of forming said assembly includes arranging a plurality of rods of superconductor material and normal material in a container of normal material to form an assembly in which substantially none of the rods of superconductor material contacts one another, and wherein the step of working to produce a bond is carried out between 350° C. and 550° C.

12. A method as in claim 1 wherein the step of forming said assembly includes providing an element of a ductile superconductor material with a sheath of a ductile normal material, mechanically working together the element and the sheath at an elevated temperature which is high enough to produce a bond between the superconductor material and the normal material but which is below the temperature at which a low melting point eutectic is formed between the superconductor and normal materials, subsequently working together the element and the sheath at approximately ambient temperatures to cold work and elongate the element in and bonded with a matrix of the normal material, cutting the elongated element and matrix into a number of lengths, and assembling the cut lengths side-by-side into a container of ductile normal material.

13. A method as in claim 4 wherein the step of forming said assembly includes providing an element of a ductile superconductor material with a sheath of a ductile normal material, mechanically working together the element and the sheath at an elevated temperature which is high enough to produce a bond between the superconductor material and the normal material but which is below the temperature at which a low melting point eutectic is formed between the superconductor and normal materials, subsequently working together the element and the sheath at approximately ambient temperatures to cold work and elongate the element in and bonded with a matrix of the normal material, cutting the elongated element and matrix into a number of lengths, and assembling the cut lengths side-by-side into a container of ductile normal material.

References Cited

UNITED STATES PATENTS

| | | | |
|---|---|---|---|
| 2,261,436 | 11/1941 | Fanger. | |
| 3,109,963 | 11/1963 | Geballe. | |
| 3,218,693 | 11/1965 | Allen et al. | 29—599 |
| 3,258,828 | 7/1966 | Swartz. | |
| 3,262,187 | 7/1966 | Allen et al. | 29—599 |
| 3,296,684 | 1/1967 | Allen et al. | 29—599 |
| 3,370,347 | 2/1968 | Garwin et al. | 29—599 |
| 3,371,407 | 3/1968 | Forsyth et al. | 29—419 |

PAUL M. COHEN, Primary Examiner

U.S. Cl. X.R.

29—419, 424, 528